Oct. 10, 1961  A. F. HICKMAN  3,003,782
BODY ROLL STABILIZER FOR MOTOR TRUCKS
Filed July 16, 1957  5 Sheets-Sheet 3

Fig. 5.

INVENTOR.
Albert F. Hickman
BY
Popp and Sommer
Attorneys.

United States Patent Office 3,003,782
Patented Oct. 10, 1961

3,003,782
BODY ROLL STABILIZER FOR MOTOR TRUCKS
Albert F. Hickman, 17 Ames St., Chautauqua, N.Y.
Filed July 16, 1957, Ser. No. 672,191
14 Claims. (Cl. 280—112)

This invention relates to a body roll stabilizer for trucks wherein vertical axle movement at one side of the truck is transmitted to the opposite end of the axle, such stabilization being particularly effective with top heavy loads when traveling around curves and over uneven roads at high speeds and in steering in and out of traffic.

With conventional leaf spring trucks, especially from one ton capacity and upward, traveling with high top heavy loads at medium and high speed over uneven roads, and in and out of traffic and around curves, the rear axle suspension for the truck body must have a very high body roll resistance. As much as four to eight times as much body roll control is required when carrying a heavy high load as compared with an empty truck or with a truck loaded up to 40% or 50% of its capacity. In a truck suspension, body roll stability is in direct proportion to the effective height of the lateral body control pivot points or centers and is in proportion to the square of the lateral spacing of the main springs. The higher the lateral body control pivot points and the greater the spacing of the main springs, the greater the roll stability.

With decreased spacing of the main springs and with lowered lateral body control pivots the main springs must be made stiffer or body roll stabilizers added to meet the body roll requirements in compensating for top heavy load conditions. When the main springs are stiffened to accommodate the top heavy load conditions they are too stiff to provide a proper ride when the truck is only partially loaded.

Air bellows as springs for motor trucks have recently been introduced to provide a soft ride for empty as well as loaded trucks and also to reduce the body height changes relative to ground, from empty to full load, to a minimum. Such air springs provide a very low vertical spring rate approaching that of a motor bus or passenger car. As a result increased body roll stabilization is required to control top heavy loads. Further in such air spring suspensions the necessary narrow spacing of the bellows and the low positions of the lateral body control centers also increases the necessity for a body roll stabilizer. However, with conventional stabilizers on trucks having such air springs, when the truck is empty or lightly loaded, the body is over controlled to the extent that it waddles along the highways when not fully loaded, thus reducing the stability and hence safety of the truck as well as resulting in a poor ride and cargo carrying qualities.

One of the objects of the present invention is to provide a flexible body roll stabilizer which can be cut into and out of service in accordance with load requirements and provide a mechanism for yieldingly transferring vertical forces from one end of an axle to the other to stabilize the body.

Another object of the invention is to provide a multistage stabilizer wherein successive increments of yielding resistance are brought into action to provide body roll stabilization as required by load conditions.

Another object of the invention is to provide such a body roll stabilizer in which the control points are widely spaced so as to overcome any narrow spacing of the main springs as well as any low positions of the lateral control centers thereof and also to permit the use of a lighter spring member in the stabilizer.

Another object is to provide such a body roll stabilizer which avoids over control when the truck is lightly loaded and at the same time provides adequate but yielding control for heavy and toy heavy loads and which will retain good ride conditions at all times.

Another object is to provide a body roll stabilizer which is particularly applicable to air spring truck suspensions.

Another object is to provide such a body roll stabilizer which is designed to last beyond the life of the truck.

Another object is to provide such a stabilizer including torsion bars in which adequate bearing area is provided to avoid concentrated stress points.

Another object is to provide such a body roll stabilizer which, barring defects, will not break under extreme load conditions and will substantially improve the performance, stability, safety, and ride qualities of the truck under all load conditions.

Other objects and advantages of the invention will be apparent from the following description and drawings in which.

Figure 1:
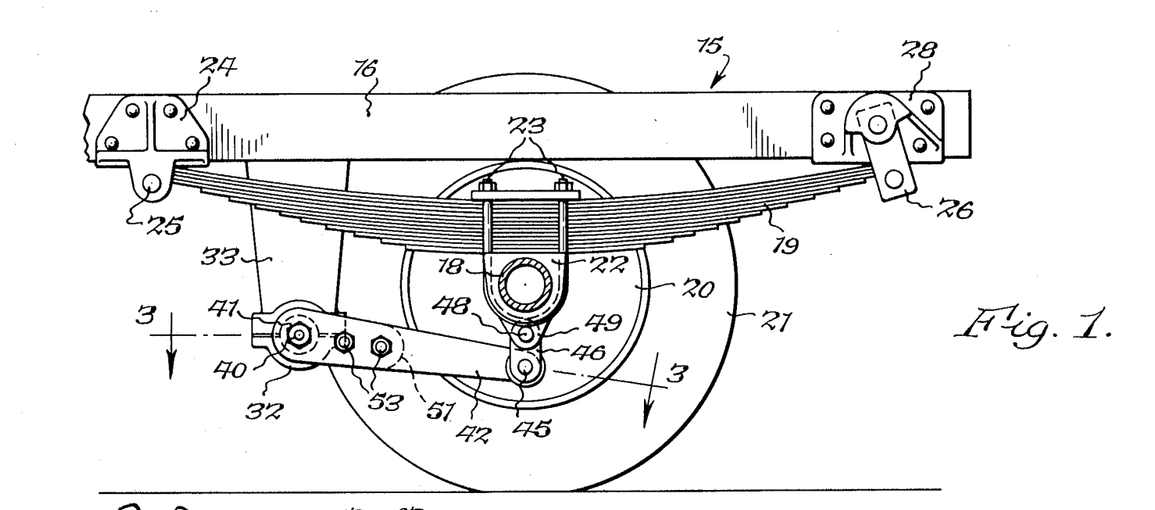
FIG. 1 is a fragmentary side elevation of the rear end of a single axle motor truck equipped with a body roll stabilizer embodying the present invention, the truck body being supported on the rear axle through conventional leaf springs.
Figures 3, 4:
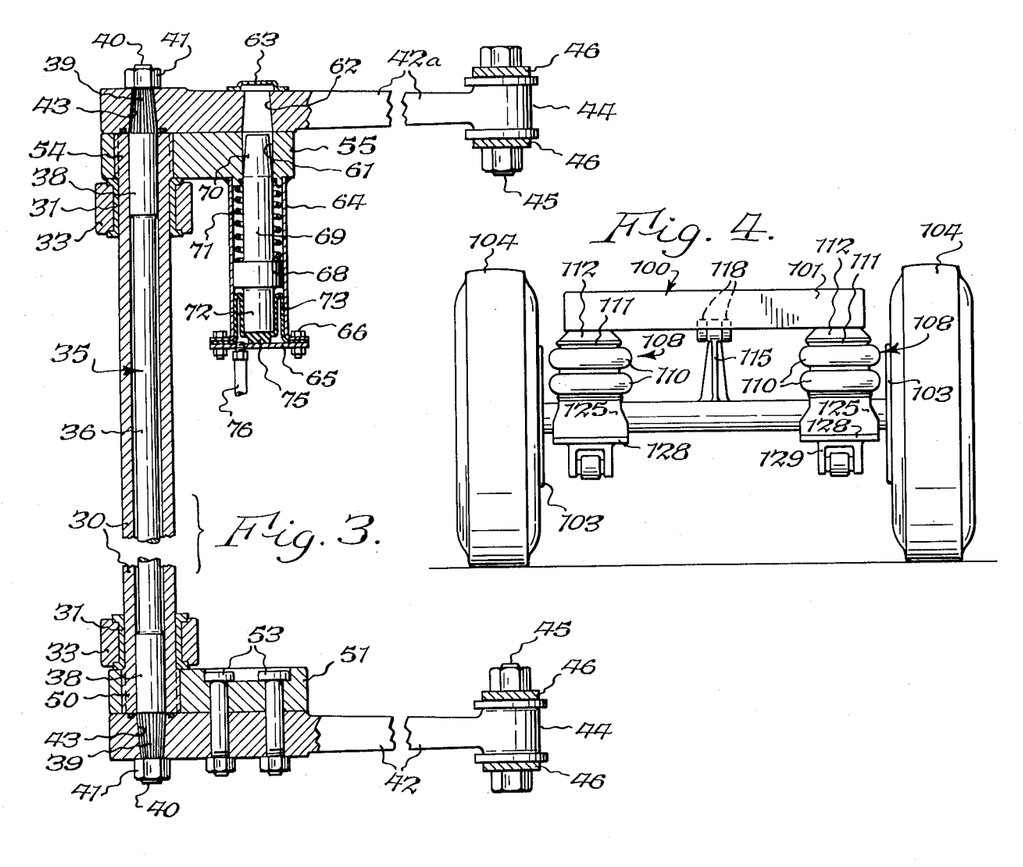
FIG. 3 is a horizontal section, partly in elevation, and taken along line 3—3 FIG. 1, this section also being applicable to the construction shown in FIG. 5 as being viewed along line 3—3 thereof.
FIG. 4 is a rear elevation of a tandem axle truck equipped with the form of body roll stabilizer illustrated in FIGS. 1–3, the truck body being supported from the tandem axles by air springs and more particularly showing the narrow spacing of the air springs.

In FIGS. 1 and 3 is illustrated the rear end of a single axle leaf spring truck or trailer equipped with one form of body roll stabilizer embodying the present invention. The truck body 15 is shown as having the usual main longitudinal side beams 16 and the rear end of the body 15 is shown as being supported by a single axle 18 through a conventional leaf spring 19. Each end of the axle 18 is supported by one or more wheels 20 having tires 21 and each end of each axle has an axle bracket 22 fixed to the axle end and to the upper side of which the leaf spring 19 is secured by the usual U-bolts 23 or in any other suitable manner. The forward end of each leaf spring 19 is shown as secured to the frame 15 by a bracket 24 and pin 25 and the rear end of each leaf spring 19 is shown as connected by a shackle 26 to another frame bracket 28.

The roll stabilizer for the body 15 is shown as including a torsion bar in the form of a tube 30 made of spring steel, preferably a silicon manganese steel, having its opposite ends journalled in bearings 31 each of which is shown as secured by a bearing cap 32 to the underside of a bearing bracket 33. These bearing brackets 33 are fast to the undersides of the two main longitudinal side beams 16 forwardly of the axle 18. Within each torsion tube 30 is arranged another torsion bar in the form of a solid rod 35 which is preferably solid and has its central part 36 ground to a smaller diameter leaving enlarged bearings 38 at the ends of the torsion rod and which are journalled in the opposite ends of the torsion tube 30. The ends 39 of the torsion rod 35 are of conical form and serrated, the diameter of the reduced central portion 36 of the torsion rod being equal to the minimum or root diameter of the serrated ends 39. Beyond these serrated ends 39 the torsion rod 35 is provided with threaded extremities 40 carrying nuts 41. These nuts 41 secure torque arms 42, 42a to the serrated ends 39, these torque arms being provided with serrated conical sockets 43 fitting the serrated ends 39. The opposite end of each of these torque arms 42, 42a is formed to provide a knuckle 44 journalling a pin 45 connected at its opposite ends with a pair of links 46. The other ends of these links connect with pins 48 carried by a pair of ears 49 depending from each of the axle brackets 22.

Intermediate the torque arm 42 and the adjacent bearing bushing 31, the end 50 of the torsion tube 30 is serrated and on this serrated end is fixed a lever arm 51 which extends along the inner face of the torque arm 42 and is secured thereto, as by bolts 53. The end 54 of the torsion tube 30 between the other torque arm 42a and the adjacent bearing bushing 31 is also serrated and to this serrated end 54 is fixed a lever arm 55 which extends along the inner vertical side of the torque arm 42a in face-to-face relation therewith but this lever arm 55 being normally free to move independently of the torque arm 42a.

It will be seen that in the form of the invention shown in FIGS. 1 and 3, the opposite ends of the axle 18 are permanently connected by a yielding body roll stabilizer comprising the torsion bar or rod 35 permanently connected to the two torque arms 42, 42a, which are in turn connected through the links 46 to the corresponding ends of the axle 18. Accordingly a list of the body 15 to one side, say to the side having the torque arm 42, will cause a corresponding downward movement of the bearing bracket 33 at this side and this will swing the corresponding torque arm 42. This swinging movement of the torque arm 42 is transmitted through the torsion bar or rod 35 to the opposite torque arm 42a, the torsion rod 35 being rotatable on its bearing surfaces 38. This causes a corresponding force to be imposed upon the opposite torque arm 42a which produces a downward movement on the corresponding end of the axle 18 so as to counteract the list or sway of the body.

The torsion bar in the form of the solid rod 35 has sufficient strength to yieldingly compensate for body roll with the truck empty or lightly loaded, but by reason of its small diameter has a very substantial amount of flexibility and is inadequate to control side sway with a full load and with a corresponding raised center of gravity. If the torsion rod 35 were made heavy enough to provide adequate body roll control with high centers of gravity, these torsion rods would overcontrol an empty or lightly loaded truck. For adequate control of a truck having a heavy and top heavy load, greatly increased body roll control is provided by cutting the torsion bar in the form of the tube 30 into service. By reason of the larger diameter of the torsion tube 30 as compared with the torsion rod 35, the torsion tube 30 has as much as four to eight times as much resistance to torsional forces and hence, when cut into service, increases the body roll control proportionately.

To cut the torsion tube 30 into service, the lever arm 55 is provided with a horizontal bore 61 extending transversely therethrough and arranged to aline with a tapered bore 62 provided in the torque arm 42a. This alinement occurs when the truck body 15 is loaded to a degree where additional body roll stabilization is required. The outer end of the tapered bore 62 is preferably capped as indicated at 63 and a cylinder 64 is shown as welded to the lever arm 55 in line with the bore 61 therethrough. This cylinder 64 projects horizontally from the lever arm 55 toward the center of the truck and its inner end is crossed by an end head 65 which is shown as secured by bolts 66. A piston 68 in the cylinder 64 has a piston rod 69 terminating in a tapered end 70 arranged to fit the tapered bore 62 of the torque arm 42a, this end 70, in the inoperative position of the piston 68, being arranged in the bore 61 of the rock arm 55.

The piston 68 is yieldingly held in its inoperative position by a helical compression spring 71 interposed between the piston 68 and the lever arm 55 and the piston 68 is shown as provided with a reduced extension 72 projecting toward the end head 65. A diaphragm 73 is fitted around this extension 72 of the piston, the margin of this diaphragm being bolted between the rim of the end head 65 and the end of the cylinder 64. This diaphragm is also provided with an enlargement 75 fitting in face-to-face relation against the end head 65. A line or flexible conduit 76 is arranged to introduce fluid under pressure into the outer end of the cylinder 64 to project the piston 68 and couple the tapered end 70 thereof with the tapered opening 62 in the torque arm 42a. Such pressure fluid can be supplied through the line 76 manually, or in response to loading the body 15 to a predetermined amount such as with the system illustrated in FIG. 3.

Regardless of whether pressurized fluid is supplied through the line 76 to the outer end of the cylinder 64 manually or automatically, in the operation of the form of the invention shown in FIGS. 1 and 3, with the truck body 15 empty or carrying only a light load, the lever arm 55 is arranged with its bore 61 out of register with the tapered bore 62 of the torque arm 42a and pressure is not impressed by the fluid line 76 so that the spring 71 holds the piston 68 in its retracted position and in which position the tapered end 70 is held retracted in the bore 61. Accordingly, with the body lightly laden, as previously explained, swaying of the body to one side causes a corresponding swinging movement of, say, the torque arm 42, the force so imposed on this torque arm 42 being transmitted through the torsion bar or rod 35 to the companion torque arm 42a thereby to impress a downward force on the opposite side of the body and tending to right the body. It will be noted that this is a yielding force, the relatively small diameter torsion rod 35 being a torsion spring which twists in response to this action and provides a yielding connection between opposite ends of the axle.

When the body is loaded to a point where additional body roll stablization is required, the tapered hole 62 comes into register with the bore 61. At this time, either manually or automatically, fluid under pressure can be admitted through the line 76 into the outer end of the cylinder 64. This drives the piston 68 outwardly thereby to project the tapered end 70 thereof into the tapered opening 62 of the torque arm 42a and key the torque arm 42a to the rock arm 60 so that these are compelled to move in unison. In the event, through some road irregularity or other condition the bore 61 is not in register with the tapered bore 62 when fluid pressure is applied to the piston 68, the tapered nose 70 will not enter the tapered bore 62 until such registry occurs. However, in the normal operation of the truck such registry is bound to occur before the truck has moved an appreciable distance and at that time coupling will be effected.

The torsion tube 30 is now cut into service and since the torsion tube can be from four to eight or more times the stiffness of the torsion rod 35, a greatly increased resistance is cut into the body roll control. Thus, in addition to the force transmitted through the stressed solid torsion rod 35, any further force impressed against, say, the torque arm 42 is transmitted through the large diameter torsion tube 30 to its rock arm 55 and through the tapered stem 70 of the piston 68 to the torque arm 42a so as to impress a corresponding force upon this torque arm with a corresponding tendency to right the truck body. It will be noted that while the torsion tube 30 is substantially stiffer than the torsion rod 35, it nevertheless is essentially a yielding spring member so that even with heavy and top heavy loads the stablizer forming the subject of the present invention acts yieldingly in its function of reducing body roll.

Figure 2:
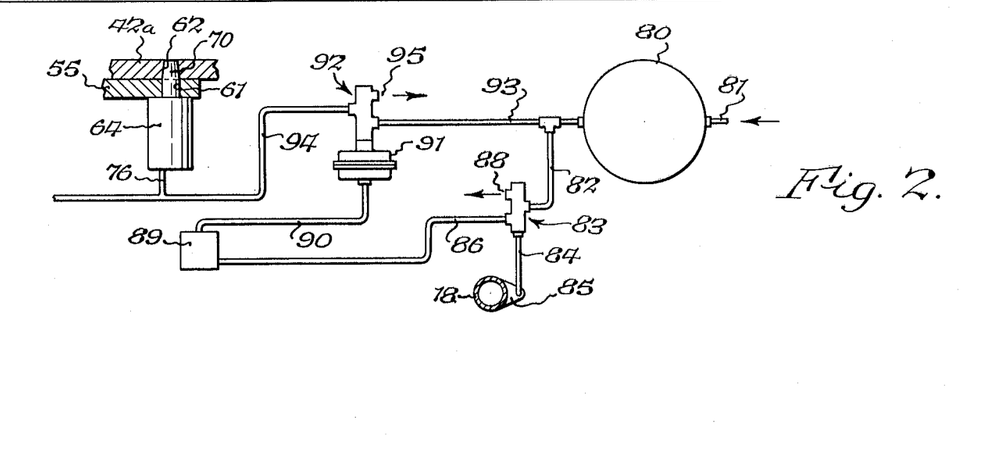
FIG. 2 is a diagrammatic representation of a pneumatic circuit whereby the body roll stabilizer, or a second stage thereof, is cut into service in response to an increase in the load carried by the truck, this control circuit being applicable to all forms of the invention illustrated.

It is apparent that many arrangements can be made to introduce fluid pressure through the line 76 into the cylinder 64 in response to loading of the truck body 15 to a predetermined weight, a control system suitable for this purpose being illustrated in FIG. 2. As shown in this figure the numeral 80 represents a high pressure air tank having a supply line 81. The outlet is shown as connected by a branch 82 with a three-way valve 83 mounted on the body 15. The stem 84 of this valve is shown as connected to a bracket 85 welded to the rear axle 18. When the body 15 is lightly laden the outlet line 86 of the three-way valve 83 is connected to its exhaust 88. When the truck is loaded to a predetermined weight the axle 18 moves toward the valve 83 so mounted on the body 15 and connects the pressure line 82 with the line 86. This pressure is applied to a time delay relay 89 which, if the line 86 remains pressurized for a long enough period of time, delivers pressure through the line 90 to an air relay 91. This air relay can be in the form of an enclosed bellows actuating a three-way valve 92. When actuated by the relay 91 high pressure air is delivered from the branch 93 to a line 94 connecting with the line 76 leading to the cylinder 64. When this occurs the tapered end 70 of the piston 68 is driven into the tapered bore of the torque arm 42a as previously described, to cut the torsion tube 30 into service. The line 94 can extend as shown, to take care of additional plungers when used for tandem axle suspensions.

As the truck is unloaded a point is reached where the axle 18 moves away from the three-way valve 83 sufficiently far to cause this valve to close off the line 82 and couple the line 86 with the exhaust 88. This exhausts the relay 91 and time delay relay 89 and causes the three-way valve 92 to block the line 93 and connect the line 94 with the exhaust 95 of this three-way valve. This permits the return spring 64 to retract the tapered nose 70 of the piston 68 from the tapered bore 62 of the torque arm 42a and thereby cut the torsion tube 30 out of service and provide the desired control, through the torsion rod 35 alone, for the lightly laden truck.

The puropse of the time delay 89 is, of course, to prevent cutting in the torsion tube 30 in response to upward and downward movement of the body relative to the axle in normal traffic over uneven roads. The time delay 89 requires that the condition of lowered body be sustained for a sufficient period to insure that this condition is due to loading the body and not to incidental spring movements.

Figure 5:
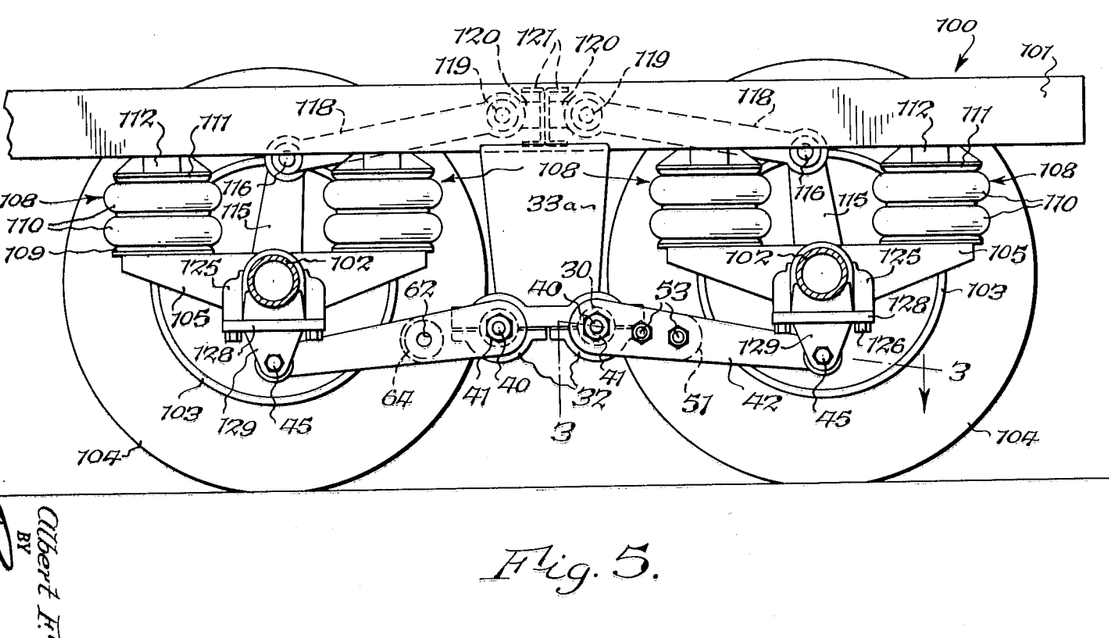
FIG. 5 is a fragmentary side elevation of the rear end of the tandem axle air spring truck illustrated in FIG. 4.

The invention is particularly applicable to trucks in which the springs are in the form of bellows which are pressurized in response to the load so as to maintain the body in substantially the same elevation with reference to the ground. The rear end of such an air spring truck or trailer, supported by tandem axles is illustrated in FIGS. 3–5. The truck body 100 is shown as having the usual main longitudinal side beams 101 at opposite sides.

The rear end of the body is shown as supported by a pair of parallel tandem axles 102 extending transversely of the body and which can be drive or dead axles as may be required. Each end of each axle is supported by one or more wheels 103 each having a tire 104. An axle bracket or pedestal 105 is fast to each end of each axle 102 and has portions extending transversely of the axle and arranged under and parallel with the main longitudinal side beams 101 of the truck frame.

These fore-and-aft extensions of each pedestal or axle bracket 105 are shown as supporting a pair of air springs indicated generally at 108. Each of these air springs is shown as comprising a base 109 mounted on the end of the corresponding axle bracket or pedestal 105 and as having a rubber body in the form of a bellows 110 having circular horizontal corrugations so as to be capable of vertical flexure. Each air spring 108 also has an upper end head 111 which supports a frame bracket 112 fast to the underside of the corresponding main longitudinal side beam 101 of the truck body. The several air springs and bellows 108 contain compressed air supplied from any suitable source (not shown and usually under a control similar to that shown in FIG. 2) to maintain the body 101 at a constant elevation regardless of load.

Each axle 102 is also shown as having one or more upwardly extending fixed arms 115 the upper end of each of which is pivotally connected, as indicated at 116 to a fore-and-aft radius rod or torque arm 118. The other end of each of these torque arms can be pivotally connected, as indicated at 119, to a frame bracket 120 shown as secured to one of a pair of back-to-back cross channel bars 121 connecting the main longitudinal side beams 101 of the truck intermediate the axles 102. Each end of each axle is also shown as including an axle bracket 125 to the underface of which is secured, as by bolts 126, a plate 128. A pair of ears 129 project downwardly from each of these plates and are adapted to connect with the stabilizer illustrated in detail in FIG. 3.

As will be observed from inspection of FIG. 4, the air springs 108 at the right and left hand sides of the truck body are arranged close to one another this being due to the fact that these air springs are located under the main longitudinal side beams 101 instead of outside of these beams as with conventional leaf spring practice. Such closely spaced spring centers decreases, of course, the body roll stability of the body 100, the wider the spacing of the springs, the less the tendency for the body to sway or list from any cause. Further the air bellows 108 are very soft and offer little resistance to body roll. Accordingly, with the narrow spacing and softness of the main air springs shown in FIGS. 4 and 5, body roll stabilizers are a necessity and at the same time should be of graduated effect to avoid waddle with a lightly ladened truck.

To provide such body roll control in two stages, the same stabilizer illustrated in FIGS. 1 and 3 is shown as applied to each of the tandem axles 102 shown in FIGS. 4 and 5.

The two pairs of torsion bars are shown as journalled on a common frame bracket 33a which corresponds with the frame bracket 33 and the pins 45 at the knuckled ends of the torque arms 42, 42a, are shown as directly connected to the axle bracket ears 129 instead of through links 45. Since in other respects the construction and operation of the body roll stabilizers shown in FIGS. 4 and 5 is identical as shown in FIGS. 1 and 3, the same reference numerals have been employed and the description of the construction of the operation will not be repeated.

When the stabilizer is used in conjunction with air springs as in FIGS. 4 and 5 and in which a constant body height is maintained, the pin 70 is cut into and out of service in response to pressure variations in the air springs. This pressure, as with a control as illustrated in FIG. 2, automatically increases and decreases to accommodate changing loads and shall maintain a constant body height.

Figures 6, 7, 8:
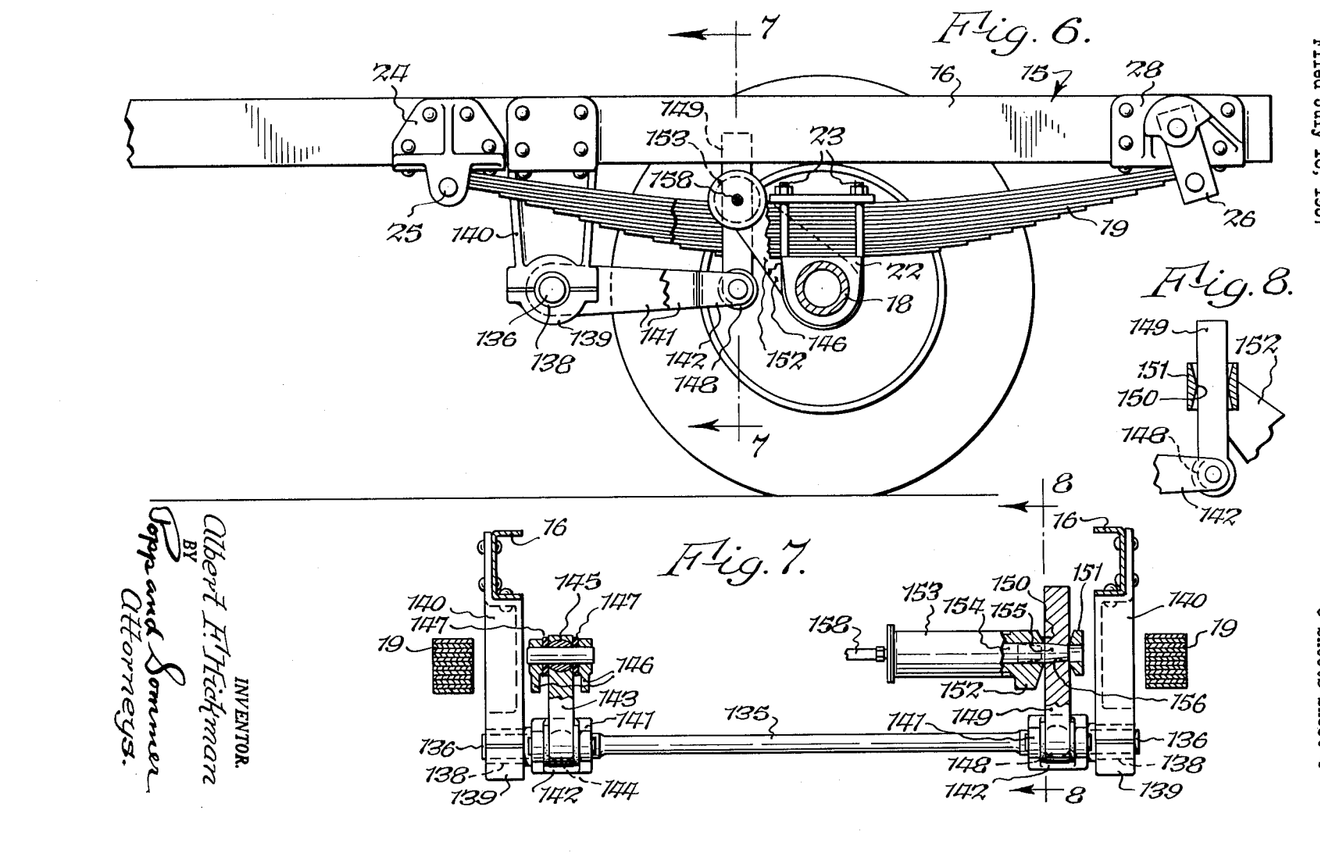
FIG. 6 is a view similar to FIGS. 1 and 5 of the rear end of a single axle leaf spring truck and showing a modified form of body roll stabilizer embodying the present invention.
FIG. 7 is a fragmentary vertical sectional view taken generally on line 7—7 FIG. 6.
FIG. 8 is a fragmentary vertical section taken generally on line 8—8 FIG. 7.

In FIGS. 6–8 is illustrated a simplified form of body roll stabilizer. The body roll stabilizer is shown in conjunction with the rear end of a single axle leaf spring truck in which the frame, leaf spring suspension, axle and wheels are identical with those shown in FIGS. 1 and 3 and hence the same reference numerals have been applied and the description is not repeated.

The roll stabilizer for the body 15 is shown in FIGS. 6–8 as including a torsion bar in the form of a solid rod 135 having its opposite enlarged ends 136 journalled in bearings 138 each of which bearings is shown as secured by a bearing cap 139 to the underside of a bearing bracket 140. The bearing brackets 140 are severally secured in any suitable manner to the main longitudinal side beams 16 of the frame in advance of the axle 18 and extend downwardly so that the torsion rod 135 is generally in horizontal alinement with the axle. Torque arms 141 are secured to the enlarged ends 136 of the torsion rod 135 and project in a generally horizontal direction toward the axle 18. Each of these torque arms is bifurcated at its forward end, as indicated at 142, and the bifurcated end of one of these torque arms embraces the lower end of a vertical link 143 to which it is secured by a ball or universal joint 144. A ball joint 145 connects the upper end of the link 143 to a pair of arms 146 which are fast to the corresponding end of the axle 18. A pair of rubber disks 147 can hold the ball joint 145 centered and at the same time permit universal action of the ball joint.

The bifurcated end 142 of the opposite torque arm 141 is connected through a ball joint 148 to a vertical slide rod 149 which projects upwardly. This slide rod 149 is shown as being square in cross section and as riding in a vertical slideway 150 provided in a lateral extension 151 of an arm 152 fast to the axle 18, this arm being parallel with the arm 146. The upper and lower parts of the slideway 150 flare out, as shown in FIGS. 7 and 8, to permit the slide rod 149 to swing transversely and fore-and-aft of the vehicle in adapting itself to the axle movements.

The arm 152 is also formed to provide a horizontal cylinder 153 which is shown as being arranged parallel with the axle 18 and as containing a piston having a piston rod 154 with a tapered end 155 arranged to project through a tapered bore 156 in the vertical slide rod 149. Fluid pressure to move the tapered projection 155 into the tapered bore 156 is supplied from a pressure line 158.

In the operation of the form of the invention shown in FIGS. 6–8, when the truck is empty or carrying a light load, the tapered end 155 is withdrawn from the tapered hole 156 of the vertical slide bar 159. Accordingly upward movement of, say, the left hand end of the axle 18 as viewed in FIG. 7, is transmitted through the arms 146 and link 143 to the torque arm 141 and thence through the torsion rod 135 to the opposite torque arm 141 so as to draw the slide rod or bar 149 downwardly. Since, however, there is no connection between the slide rod 149 and the arm 152 carrying the slideway 150, this slide bar 149 merely slides in the slideway 150 and has no effect upon the arm 152 of the axle.

When the truck is loaded to the extent that body roll control is required, fluid under pressure is admitted through the line 158 into the cylinder 153 either manually, or automatically as through the circuit illustrated in FIG. 2. This imposes pressure on the piston to urge the tapered end 155 of the piston rod against the slide rod or bar 149. Accordingly when the movement of the slide bar 149 causes the tapered bore 156 to come into register with the tapered end 155 of the piston rod, this tapered end 155 jumps into the tapered bore 156 to lock the slide bar 149 to the outer end of the arm 152. When this occurs upward movement of the said one end of the axle 18 through the arms 146, link 143, torque arm, 141, torsion rod 135, torque arm 141 and slide bar 149 is now transmitted through the arm 152 to the opposite end of the axle 18 so as to effect body roll stabilization.

It will be noted that in this form of the invention the body roll control is transmitted through the torsion spring 135 so that a yielding control is provided at all times.

Figure 9:
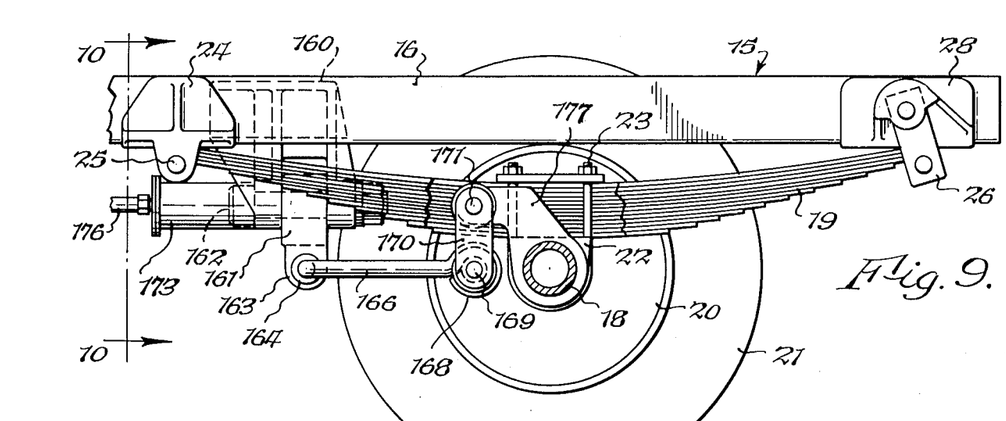
FIG. 9 is another fragmentary side elevational view of the rear end of a single axle leaf spring truck and showing a further modified form of body roll stabilizer embodying the present invention.
Figure 10:
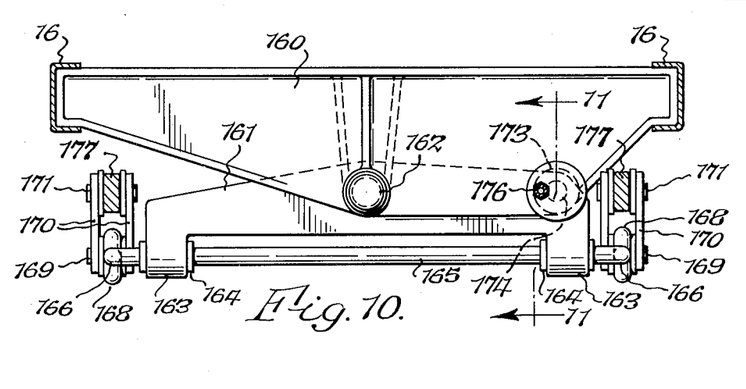
FIG. 10 is a vertical section taken generally on line 10—10 FIG. 9.
Figure 11:
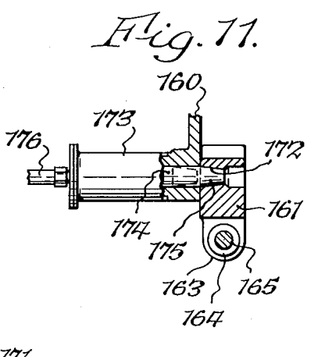
FIG. 11 is a fragmentary vertical section taken generally on line 11—11 FIG. 10.

In FIGS. 9, 10 and 11 is illustrated another modification of the invention. The body roll stabilizer is shown in conjunction with the rear end of a single axle leaf spring truck in which the frame, leaf spring suspension, axle and wheels are identical with those shown in FIGS. 1 and 3 and hence the same reference numerals have been applied and the description is not repeated.

With the form of the invention shown in FIGS. 9–11 across beam 160 is provided between the main longitudinal side beams 16 of the truck frame, this cross beam being arranged in advance of the rear axle 18. At the center of this cross beam a transverse walking beam 161 is suitably pivoted, as indicated at 162, to swing about a horizontal fore-and-aft axis with reference to the line of travel of the vehicle. The opposite ends of the walking beam 161 are formed to provide housings 163 for bearings 164, the latter carrying a torsion rod 165 which extends transversely of the truck frame 15. The opposite ends of the torsion rod 165 are shown as being extended forwardly to provide arms 166 the forward ends of which are each formed to provide an eye 168 pivotally embracing a pin 169 at the lower end of a pair of links 170. The upper ends of these links are pivotally supported by a cross pin 171 carried at the end of an axle bracket 177 fixed to the axle 18.

As best shown in FIG. 11 the rear side of the cross beam 160 is in face to face contact with the forward side of the walking beam 161 and at one end the walking beam 161 is provided with a tapered bore 172 enlarging toward the cross beam 160. In register with this tapered bore 172 the cross beam 160 is formed to provide a cylinder 173 for a piston having a piston rod 174 with a tapered end 175 arranged to be projected into the tapered bore 172 when fluid pressure is introduced into the cylinder 173 through the line 176.

In the operation of the form of the invention shown in FIGS. 9–11, when the truck is empty or carrying a light load, the tapered end 175 is withdrawn from the tapered hole 172 of the walking beam 161. In consequence this walking beam is entirely free to oscillate about its pivot 162. Accordingly upward movement of either end of the axle 18, through the corresponding axle bracket 177, links 170 and arms 166 raises the corresponding end of the walking beam 161. However this upward movement of one of the arms 166 is not transmitted through the torsion rod 165 to effect a corresponding movement of the opposite arm 166 because the walking beam does not provide a positive fulcrum for the torsion rod. Instead the corresponding end of the walking beam raises in response to the upward force imposed upon the adjacent arm 166, the walking beam merely following the up and down movement of the opposite ends of the axle 18, and no substantial amount of force is transmitted from one end of the axle 18 to the other.

When the truck is loaded to the extent that body roll control is required, fluid under pressure is admitted through the line 176 into the cylinder 173 either manually, or automatically as through the circuit illustrated in FIG. 2. This imposes pressure on the piston to urge the tapered end 175 of this piston rod 174 rearwardly. Accordingly when the tapered bore 172 of the walking beam 161 comes into register with the piston rod 174, the tapered end 175 jumps into the tapered bore 172 so as to lock the walking beam 161 to the cross frame beam 160 and hence, in effect, make this walking beam a rigid part of the frame.

When this occurs, upward movement of one end of the axle 18, through the axle bracket 172 and links 170 raises the corresponding arm 166. At this time the fulcrum for this arm, namely the corresponding end of the locked walking beam 161, is incapable of rising and hence this upward movement of the arm 166 twists the torsion rod 165 and effects a corresponding movement of the arm 166 at the opposite end of the torsion rod, thereby to draw down the corresponding side of the body 15 and provide body roll control. It will be noted that in the form of the invention shown in FIGS 9–11, as with all other forms of the invention, the body roll control force is transmitted through a spring so that a yielding control is provided at all times.

From the foregoing it will be seen that the present invention provides a body roll stabilizer for motor trucks which acts resiliently to restrain body roll and which can be cut into service in one or more stages thereby to avoid overcontrol with a lightly laden truck and to provide the requisite control when the truck is carrying a heavy and top heavy load. It will also be seen that the invention is particularly applicable to trucks having closely spaced soft springs as with air spring trucks and which require an auxiliary body roll contact device for stability and safety even with moderate loads but which would have a pronounced tendency to waddle with light loads if overcontrolled.

I claim:

1. A body roll stabilizer for a truck having a frame member and an axle member, comprising a torque arm at each end of said axle member and each fulcrumed at one end on one of said members to swing vertically relative to said axle member, means pivotally connecting the other ends of said torque arms to the other of said members, spring means arranged to yieldingly transmit movement of the fulcrumed end of one torque arm to the fulcrumed end of the other torque arm, and means responsive to changes in the static load on the truck arranged to connect and disconnect said spring means and one torque arm thereby to render said torque arms and spring means operative and inoperative in so transmitting movement of one torque arm to the other torque arm.

2. A body roll stabilizer for a truck having a frame member and a rear axle member, comprising a torque arm at each end of said axle member and each fulcrumed at one end on said frame member in advance of said axle member to swing vertically relative to said axle member, means pivotally connecting the rear ends of said torque arms to the opposite ends of said axle member, spring means arranged to yieldingly transmit movement of the fulcrumed end of one torque arm to the fulcrumed end of the other torque arm, and means responsive to changes in the static load on the truck arranged to connect and disconnect said spring means and one torque arm thereby to render said torque arms and spring means operative and inoperative.

3. A body roll stabilizer for a truck having a frame member and an axle member, comprising a torque arm at each end of said axle member and each fulcrumed at one end on one of said members to swing vertically relative to said axle member, means pivotally connecting the other ends of said torque arms to the other of said members, a first spring means yieldingly connecting together the fulcrumed ends of said torque arms to transmit vertical movement of one end of said axle member to the opposite end thereof, a second spring means, and means responsive to changes in the static load of the truck arranged to releasably couple said second spring means to the stabilizer to augment the effect of said first spring means.

4. A body roll stabilizer for a truck having a frame member and an axle member, comprising a torque arm at each end of said axle member and each fulcrumed at one end on one of said members to swing vertically relative to said axle member, means pivotally connecting the other ends of said torque arms to the other of said members, a first torsion bar yieldingly connecting together the fulcrumed ends of said torque arms to transmit vertical movement of one end of said axle member to the opposite end thereof, a second torsion bar arranged generally parallel with said first torsion bar, and means responsive to changes in the static load of the truck arranged to couple said second torsion bar into operative relation with the opposite ends of said first torsion bar to add to the effect of said first torsion bar.

5. A body roll stabilizer for a truck having a frame member and an axle member, comprising a torque arm at each end of said axle member and each fulcrumed at one end on one of said members, means pivotally connecting the other ends of said torque arms to the other of said members, a first torsion bar yieldingly connecting together the fulcrumed ends of said torque arms to transmit vertical movement of one end of said axle member to the opposite end thereof, a torsion tube surrounding said first torsion bar, means securing one end of said torsion tube to the connected ends of said torsion bar and said one torque arm, and means arranged to releasably couple the opposite end of said torsion tube with the other torque arm to add to the effect of said first torsion bar.

6. A body roll stabilizer for a truck having a frame and an axle comprising a torsion tube arranged generally parallel with and in front of said axle, a bearing journalling each end of said torsion tube and secured to said frame, a torsion rod journalled at its opposite ends in said torsion tube and projecting outwardly from opposite ends of said torsion tube, a torque arm at each end of said axle member and each having one end fast to the corresponding projecting end of said torsion bar, means pivotally connecting the opposite ends of said torque arms to the corresponding ends of said axle, means securing one end of said torsion tube to the corresponding torque arm, and means releasably securing the opposite end of said torsion tube to the other radius rod.

7. A body roll stabilizer as set forth in claim 6 wherein said last means comprises a lever arm fast to said opposite end of said torsion tube and arranged to swing adjacent said other torque arm and a pin movably mounted on said lever arm and arranged to enter a bore provided in said other radius rod.

8. A body roll stabilizer as set forth in claim 6 wherein said last means comprises a lever arm fast to said opposite end of said torsion tube, said lever arm being provided with a bore arranged to aline with a bore in said other torque arm, a locking pin arranged to enter said bores, and piston means arranged to actuate said pin.

9. In a truck having a frame, an axle, and springs at each end of said axle and supporting the frame thereon, the combination therewith of a body roll stabilizer, comprising a torsion bar journalled on said frame and extending lengthwise and alongside said axle, a torque arm connecting one end of said torsion bar with the adjacent one end of said axle to translate vertical movement of said one end of said axle into rotary movement of said one end of said torsion bar, a second torque arm between the other end of said torsion bar and the other end of said axle, means including a releasable latch rendering said second torque arm operative and inoperative to translate vertical movement of said other end of said axle into rotary movement of said other end of said torsion bar, and means responsive to static load on the frame actuating said releasable latch.

10. A body roll stabilizer as set forth in claim 9 wherein said latch actuating means comprises a cylinder, a piston, a source of fluid under pressure, and valve means actuated in response to relative vertical movement of said frame and axle and controlling the flow of said fluid under pressure to and from said cylinder.

11. A body roll stabilizer as set forth in claim 9 wherein said latch releasably connects said second torque arm with said other end of said axle.

12. A body roll stabilizer as set forth in claim 11 wherein said releasable latch comprises a member having a generally vertical slideway, a slide bar sliding in said slideway, and a coupling pin arranged to be projected through alining bores in said slide bar and member to compel them to move in unison.

13. A body roll stabilizer as set forth in claim 9 wherein said torsion bar is journalled on said frame through a cross bar which in turn is journalled on said frame in advance of said axle, and wherein said releasable latch restrains rotation of said cross bar about its axis.

14. A body roll stabilizer as set forth in claim 13 wherein said latch includes a pin mounted for fore-and-aft sliding movement on said frame and projectible into a bore in said cross bar.

References Cited in the file of this patent

UNITED STATES PATENTS

| | | |
|---|---|---|
| 1,610,754 | Davidson | Dec. 14, 1926 |
| 2,048,866 | Hunt | July 28, 1936 |
| 2,133,773 | Rossman | Oct. 18, 1938 |
| 2,620,181 | Troche | Dec. 2, 1952 |
| 2,733,934 | Muller | Feb. 7, 1956 |

FOREIGN PATENTS

| | | |
|---|---|---|
| 1,079,671 | France | May 19, 1954 |
| 715,426 | Great Britain | Sept. 15, 1954 |